United States Patent
Yoon (10) Patent No.: US 9,731,724 B2
(45) Date of Patent: Aug. 15, 2017

(54) AUTONOMOUS DRIVING CONTROL APPARATUS AND METHOD FOR DETERMINING LANE CHANGE AND TIMING THEREOF BASED ON ANALYSIS FOR SHAPES AND LINKS OF FORWARD ROAD

(71) Applicant: Hyundai Motor Company, Seoul (KR)

(72) Inventor: Ji Hyun Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 14/935,388

(22) Filed: Nov. 7, 2015

(65) Prior Publication Data

US 2017/0043780 A1    Feb. 16, 2017

(30) Foreign Application Priority Data

Aug. 10, 2015    (KR) ........................ 10-2015-0112340

(51) Int. Cl.
| | | |
|---|---|---|
| *G01C 21/34* | (2006.01) | |
| *B60W 30/18* | (2012.01) | |
| *B60W 10/20* | (2006.01) | |
| *B60W 10/04* | (2006.01) | |

(52) U.S. Cl.
CPC ...... *B60W 30/18163* (2013.01); *B60W 10/04* (2013.01); *B60W 10/20* (2013.01); *B60W 2550/14* (2013.01); *B60W 2550/30* (2013.01); *B60W 2710/20* (2013.01); *B60W 2720/10* (2013.01); *B60W 2900/00* (2013.01)

(58) Field of Classification Search
CPC ....... B60W 2550/20; B60W 2550/402; B60W 2750/30; B60W 30/08; B60W 30/16; G01C 21/26; G01C 21/3655; G01C 21/3658; B62D 15/0255; B62D 15/0265
USPC .................. 701/25, 26, 437, 532; 73/178 R; 340/988, 990, 995.2
See application file for complete search history.

(56) References Cited

U.S. PATENT DOCUMENTS

| | | | | |
|---|---|---|---|---|
| 8,635,010 B2 * | 1/2014 | Li | ........................... | G01C 21/26 362/37 |
| 2007/0106470 A1 * | 5/2007 | Nakayama | ......... | G01C 21/3629 701/437 |
| 2011/0276257 A1 * | 11/2011 | Zaitsu | .................. | G08G 1/0104 701/117 |

(Continued)

FOREIGN PATENT DOCUMENTS

| | | |
|---|---|---|
| JP | H1026932 A | 1/1998 |
| JP | 3584679 B2 | 11/2004 |

(Continued)

*Primary Examiner* — Dalena Tran
(74) *Attorney, Agent, or Firm* — Mintz Levin Cohn Ferris Glovsky and Popeo, P.C.; Peter F. Corless (57) ABSTRACT

An autonomous driving control apparatus and method are provided to automatically determine whether a lane change is required by considering shapes of forward roads, a link relationship between the roads, a speed limit, the number of lanes, road characteristics (e.g., a crossroad, a crosswalk, an interchange, a junction, a speed bump, a dead-end, etc.), and the like which are recognized from a detailed map. The method also effectively determines a timing of the lane change when the lane change is required for a driver to more conveniently, stably, and efficiently arrive at a destination using an autonomous driving.

16 Claims, 8 Drawing Sheets

(56) References Cited

U.S. PATENT DOCUMENTS

2012/0123672 A1     5/2012   Kojima et al.

FOREIGN PATENT DOCUMENTS

| | | |
|---|---|---|
| JP | 2007-127416 A | 5/2007 |
| JP | 2007-127418 A | 5/2007 |
| JP | 2009-047491 A | 3/2009 |
| JP | 2012-107894 A | 6/2012 |
| JP | 5333624 B2 | 11/2013 |
| JP | 2014-016369 A | 1/2014 |
| JP | 5464978 B2 | 4/2014 |
| JP | 2014-089131 A | 5/2014 |
| JP | 2015-074426 A | 4/2015 |
| KR | 10-1354636 | 1/2014 |

* cited by examiner

AUTONOMOUS DRIVING CONTROL APPARATUS AND METHOD FOR DETERMINING LANE CHANGE AND TIMING THEREOF BASED ON ANALYSIS FOR SHAPES AND LINKS OF FORWARD ROAD

CROSS-REFERENCE TO RELATED APPLICATION

This application is based on and claims the benefit of priority to Korean Patent Application No. 10-2015-0112340, filed on Aug. 10, 2015 in the Korean Intellectual Property Office, the disclosure of which is incorporated herein in its entirety by reference.

TECHNICAL FIELD

The present disclosure relates to an autonomous driving control apparatus and method, and more particularly, to an autonomous driving control apparatus and method for determining a lane change and a timing thereof based on shapes of forward roads, a link relationship between the roads, and the like recognized from a detailed map for autonomous driving.

BACKGROUND

Today, due to an increase in use of electric vehicles support to conveniently arrive at a destination while minimizing a manual driving by the aid of an autonomous driving apparatus has been increasingly researched and developed. To implement a more convenient and stable autonomous driving, performance of the autonomous driving apparatus has improved. However, there is a need for an autonomous driving apparatus for solving a limitation of the autonomous driving apparatus according to the related art and more effectively assisting the driving of the driver. The autonomous driving apparatus is related to the technologies such as Adaptive (responsive) Cruise Control System (ACCS), Forward Vehicle Collision Avoidance System (FV-CAS), Side and Backward Vehicle Collision Avoidance System (SBVCAS) and Lane Departure Warning System (LDWS), etc.

SUMMARY

The present disclosure provides an autonomous driving control apparatus and method capable of automatically determining whether a lane change is required and effectively determining a timing of the lane change when the lane change is required, based on shapes of forward roads, a link relationship between the road, a speed limit, the number of lanes, road characteristics (e.g., crossroads, crosswalks, interchanges, junctions, speed bumps, dead-ends), and the like, detected using a detailed map, to support a more convenient, stable, and efficiently arrival at a destination by the aid of autonomous driving.

According to an exemplary embodiment of the present disclosure, an autonomous driving control method of a vehicle may include: generating a path plan from a current position of the vehicle toward a destination with reference to a map database while driving the vehicle; determining a farthest segment among the segments for each of the lanes from the current position of the vehicle to a predetermined target segment on the path plan as a local goal point; determining whether a lane change is required to arrive at the local goal point and determining a direction of the lane change based on the determination of whether the lane change is required; and determining a lane change completion segment among the segments for each of the lanes up to the target segment and determining a segment position before a distance for the lane change from an end of the lane change completion segment as a timing position for the lane change.

The path plan may include information regarding a shape of a road, a link relationship between the segments linking between road separation nodes, a speed limit of the vehicle, the number of lanes, or events (e.g., road characteristics). The target segment may include a segment which is spaced apart from the current position of the vehicle in a forward direction by a predetermined distance, a farthest segment that corresponds to when a summation of the number of segments forward from the current position of the vehicle becomes a predetermined number, or a farthest segment that corresponds to when a summation of the number of events forward from the current position of the vehicle becomes the predetermined number.

In the determination of the direction of the lane change, the direction of the lane change in a left direction or a right direction may be determined based on whether the vehicle arrives at the local goal point by a straight driving after performing the lane change in the left or right direction. In addition, in the determination of the segment position as the timing position for the lane change, a segment before segments having a road characteristic including a crossroad, a crosswalk, an interchange, a junction, a speed bump, or a dead-end may be determined as the lane change completion segment.

When the segment before the distance for the lane change has a road curvature of a predetermined threshold value or greater, when the number of lanes is one, for a crossroad, or during a traffic jam state due to an excessive traffic volume within a corresponding segment, in the determination of the segment position as the timing position for the lane change, a segment immediately before or after the corresponding segment may be determined as the timing position for the lane change.

In the determination of the segment position as the timing position for the lane change, when the distance (K) for the lane change is greater than a distance ($D_{event}$) from the current position of the vehicle to the end of the lane change completion segment, a segment position before the distance for the lane change may be determined as the timing position for the lane change. In addition, in the determination of the segment position as the timing position for the lane change, a minimum distance ($D_{min\_require} = D_{lc} + D_{dec}$) necessary for the lane change may be calculated by calculating a distance ($D_{lc}$) in which the vehicle is moved during a process of performing the lane change and a deceleration distance ($D_{dec}$), and a preset distance ($D_{margin}$) of stability of the lane change may be reflected to calculate the distance for the lane change ($K = D_{min\_require} + D_{margin}$).

In the determination of the segment position as the timing position for the lane change, the following Equation may be used, $$D_{lc} = v(t_1 * p + t_2 * (p-1))$$ Equation wherein v is a speed of the vehicle, $t_1$ is a time necessary for the lane change, and $t_2$ is a preset time for stability between the lane change and a next lane change when the number of execution times (p) of the lane change is two or more.

According to another exemplary embodiment of the present disclosure, an autonomous driving control apparatus of a vehicle may include: a path generator configured to generate a path plan from a current position of the vehicle toward a destination with reference to a map database while the vehicle is being driven; a segment/local goal point determiner configured to determine a farthest segment among the segments for each lane from the current position of the vehicle to a predetermined target segment on the path plan as a local goal point; a lane change/direction determiner configured to determine whether a lane change is required to arrive at (e.g., to reach) the local goal point and determine a direction of the lane change based on the determination of whether the lane change is required; and a lane change timing determiner configured to determine a lane change completion segment the segments for each lane up to the target segment and determine a segment position before a distance for the lane change from an end of the lane change completion segment as a timing position for the lane change. Each of the above modules or units may be executed by a centralized controller configured to generally operate the autonomous driving control apparatus.

The path plan may include information regarding a shape of a road, a link relationship between the segments linking between road separation nodes, a speed limit of the vehicle, the number of lanes, or road characteristics. The target segment may include a segment which is spaced apart from the current position of the vehicle in a forward direction by a predetermined distance, a farthest segment that corresponds to when a summation of the number of segments forward from the current position of the vehicle becomes a predetermined number, or a farthest segment that corresponds to when a summation of the number of events forward from the current position of the vehicle becomes the predetermined number.

The lane change/direction determiner may be configured to determine a direction of the lane change in a left direction or a right direction based on whether the vehicle arrives at the local goal point by driving after performing the lane change in the left or right direction. The lane change timing determiner may be configured to determine a segment before segments having an event including a crossroad, a crosswalk, an interchange, a junction, a speed bump, or a dead-end, as the lane change completion segment.

When the segment before the distance for the lane change has a road curvature of a predetermined threshold value or greater, when the number of lanes is one for a crossroad, or for a traffic jam state due to an excessive traffic volume within a corresponding segment, the lane change timing determiner may be configured to determine a segment immediately before or after the corresponding segment as the timing position for the lane change.

When the distance (K) for the lane change is greater than a distance ($D_{event}$) from the current position of the vehicle to the end of the lane change completion segment, the lane change timing determiner may be configured to determine a segment position before the distance for the lane change, as the timing position for the lane change. In particular, the lane change timing determiner may be configured to calculate the distance for the lane change ($K=D_{min\_require}+D_{margin}$) by calculating a distance ($D_{lc}$) in which the vehicle is moved during a process of performing the lane change and a deceleration distance ($D_{dec}$) to calculate a minimum distance ($D_{min\_require}=D_{lc}+D_{dec}$) necessary for the lane change, and reflecting a preset distance ($D_{margin}$) for stability of the lane change.

The lane change timing determiner may calculate the following Equation, $$D_{lc}=v^{*}(t_{1}^{*}p+t_{2}^{*}(p-1)) \quad \text{Equation}$$

wherein v is a speed of the vehicle, $t_1$ is a time necessary for the lane change, and $t_2$ is a preset time for stability between the lane change and a next lane change when the number of execution times (p) of the lane change is two or more.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described in detail with reference to the accompanying drawings. Here, like reference numerals denote like elements in the respective drawings. In addition, a detailed description of functions and/or configurations which are already known will be omitted. The contents disclosed below mainly describe portions necessary to understand operations according to various exemplary embodiments and a description of elements which may obscure the gist of the description will be omitted. In addition, some components shown in the drawings may be exaggerated, omitted or schematically illustrated. The size of each component does not exactly reflect its real size and accordingly, the contents described in this specification are not limited by relative sizes or intervals of the components illustrated in the respective drawings.

Figure 1:
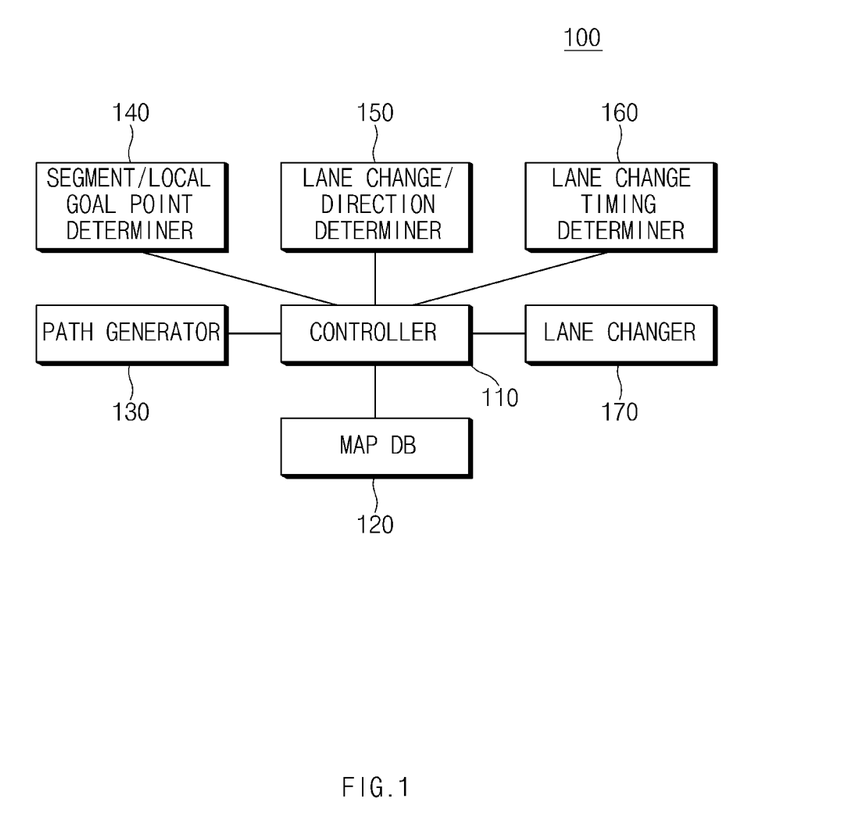
FIG. 1 is a block diagram of an autonomous driving control apparatus according to an exemplary embodiment of the present disclosure.

FIG. 1 is a block diagram of an autonomous driving control apparatus 100 according to an exemplary embodiment of the present disclosure. An operation of the autonomous driving control apparatus 100 according to an exemplary embodiment of the present disclosure will be described with reference to FIG. 2.

Referring to FIG. 1, the autonomous driving control apparatus 100 according to an exemplary embodiment of the present disclosure may include a controller 110, a map database (DB) 120, a path generator 130, a segment/local goal point determiner 140, a lane change/direction determiner 150, a lane change timing determiner 160, and a lane changer 170. The respective components of the autonomous driving control apparatus 100 as described above may be determined by hardware such as a semiconductor processor, software such as an application program, or a combination thereof. The controller 110 may be configured to generally operate the other components of the autonomous driving control apparatus 100 as described above. In some cases, the controller 110 may also be implemented to include all or a portion of other components of the autonomous driving control apparatus 100 to perform functions thereof.

Figure 2:
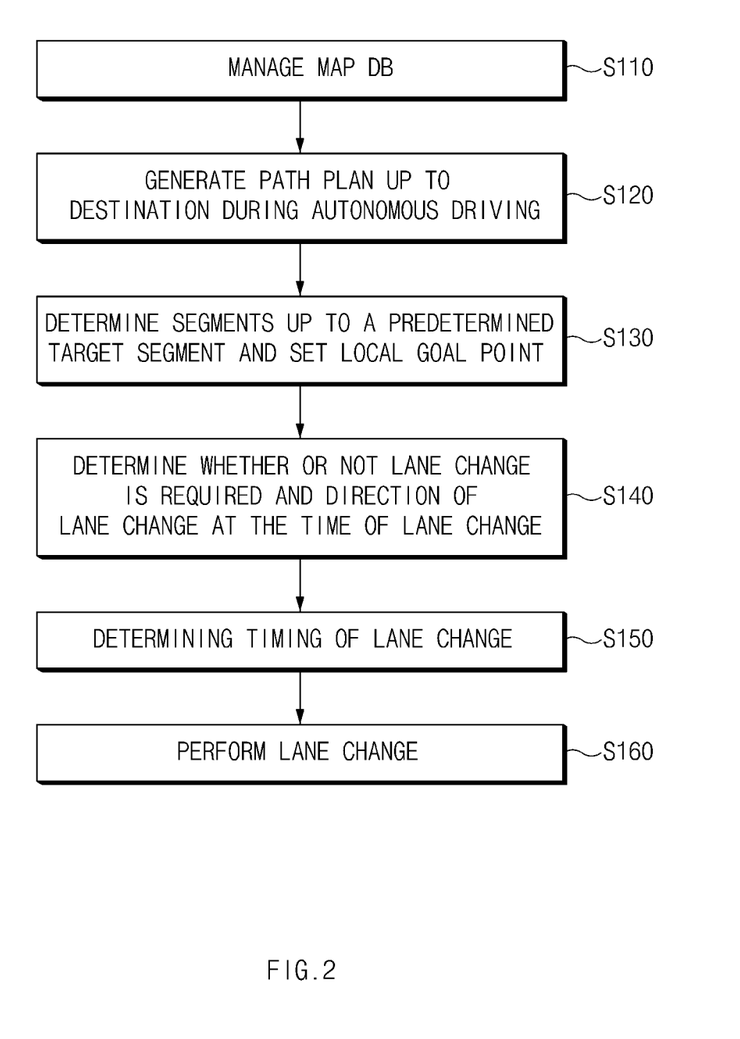
FIG. 2 is a flow chart illustrating an operation of the autonomous driving control apparatus according to the exemplary embodiment of the present disclosure.

The map DB 120 may be configured to store detailed map information having a collection of segments as basic information for an autonomous driving with regard to a road and traffic situation of each region (see S110 of FIG. 2). The segments may be configured in a form of a function (e.g., a cubic or higher-order function) representing shapes of roads to be displayed on a display apparatus. For example, one road may include one segment or more than two segments, the respective segments may be linked to each other to configure an overall map, and information regarding a link relationship may also be included and stored in the map DB 120.

In other words, the map DB 120 may be configured to the detailed map information regarding the shapes of the roads, a link relationship between the segments (e.g., the roads linking between separation nodes of the roads such as the crossroads, interchanges, junctions, and the like), a speed limit of a vehicle, the number of lanes, events or road characteristics (e.g., the crossroads, crosswalks, the interchanges, the junctions, speed bumps, dead-ends, and the like), and the like, with regard to the road and traffic situation of each region based on the segments as described above. In addition to traffic related data as described above, the map DB 120 may be configured to store information regarding a polygon, a polyline a text, etc., related to a background of the map and information regarding facilities, directions (or bearings), etc., to indicate a basic map. In some cases, the map DB 120 may further be configured to store safety related data including information regarding a current/prediction traffic situation (e.g., traffic congestion, etc.), information regarding an accident related traffic situation, information regarding a position, a type, etc., related to safe driving zones (e.g., a game reserve, a construction region, etc.), and the like.

The path generator 130 may be configured to perform a navigation function of generating a corresponding path plan for arriving at (e.g., reaching) a destination from a current position during the autonomous driving of the vehicle with reference to the map DB 120 (see S120 of FIG. 2). The path generator 120 may further be configured to generate a path plan including information regarding the shapes of the roads, the link relationship between the segments (e.g., the roads linking between separation nodes of the roads such as the crossroads, the interchanges, the junctions, and the like), the speed limit of the vehicle, the number of lanes, the road characteristics (e.g., the crossroads, the crosswalks, the interchanges, the junctions, the speed bumps, the dead-ends, and the like), and the like, on a path between the current position and the destination.

Figure 3:
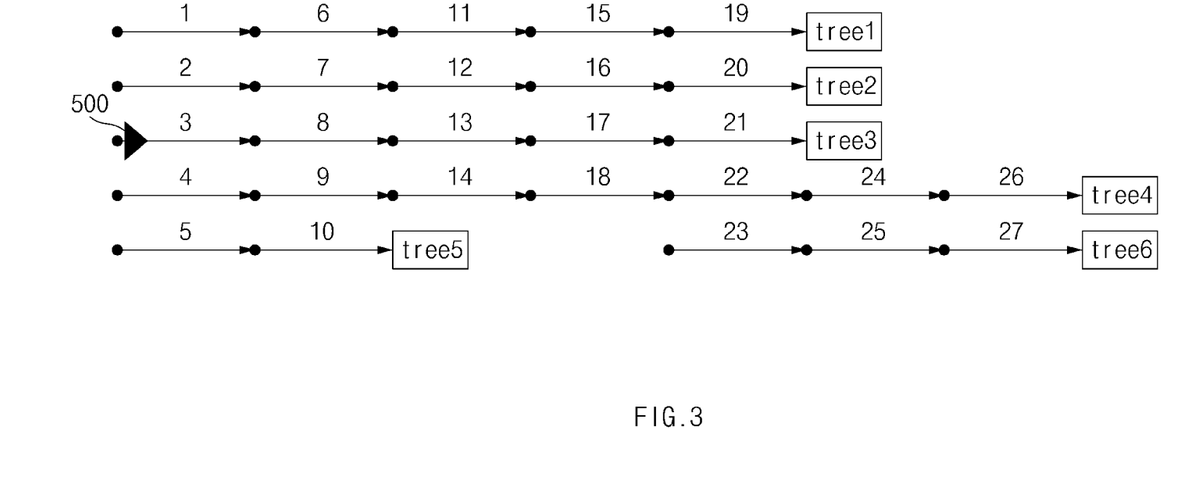
FIG. 3 is an illustrative diagram illustrating a link relationship between segments having a form of six trees from a current position of a vehicle to a local goal point, according to an exemplary embodiment of the present disclosure.

The segment/local goal point determiner 140 may be configured to determine all of the segments for each lane from the current position of the vehicle to a target segment from the path plan generated as described above, and determine (or set) a farthest segment(s) among the segments for each lane as a local goal point(s) (S130). For example, as in an example of FIG. 3, when a self-vehicle 500 (e.g., autonomous vehicle) is driving on a segment 3 and all of the segments for each lane from a current position of the self vehicle 500 to the target segment form a segment link relationship in a form of six trees, a segment 26 and a segment 27 may be set as the local goal points.

Particularly, the target segment may be determined as (1) a corresponding segment(s) which is spaced apart from the current position of the vehicle in a forward direction by a predetermined distance (e.g., N (real number) meters), (2) a farthest segment that corresponds to when a summation of the number of segments forward from the current position of the vehicle becomes a predermined number (e.g., M (natural number)), (3) a farthest segment that corresponds to when a summation of the number of events (e.g., the crossroads, the crosswalks, the interchanges, the junctions, the speed bumps, the dead-ends, and the like) forward from the current position of the vehicle becomes the predetermined number (e.g., M (natural number)), or the like.

The segment/local goal point determiner 140 may be configured to determine all of the segments up to the above-mentioned target segment for each lane and set the farthest segment among all of the segments for each lane as the local goal point(s). Further, the lane change/direction determiner 150 may be configured to determine whether a lane change from a current road is required to arrive at the local goal point from the current position of the vehicle during the autonomous driving of the vehicle, and determine which direction to change the lane among a fight direction or a left direction from the current road, in response to determining that the lane change is required (S140).

When the vehicle is being continuously driven substantially straight on a road on which the vehicle is currently positioned, the lane change/direction determiner 150 may be configured to determine whether the vehicle may arrive at the local goal point, determine that the lane needs to be maintained when the vehicle may arrive at the local goal point, and determine that the lane change is required when the vehicle may not arrive at the local goal point. As in the example of FIG. 3, since the road on which the self vehicle 500 is currently positioned may be a three-lane road, which is the segment 3 included in a tree 3, the self vehicle 500 may not arrive at the segments 26 and 27, which are the local goal points, straightly from the current road (e.g., turns may be required to reach the local goal points). Therefore, the lane change/direction determiner 150 may be configured to determine that the lane change is required.

In addition, in response to determining that the lane change is required as described above, the lane change/direction determiner 150 may be configured to determine a direction of a lane change in any one of the right direction and the left direction from the current road. When the vehicle is currently driving in the leftmost lane, the lane change/direction determiner 150 may be configured to determine the land change in the right direction and when the vehicle is currently in the rightmost lane, the lane change/direction determiner 150 may be configured to determine the lane change in the left lane.

When the vehicle is not on the above-mentioned one lane (the leftmost lane) or the rightmost lane, the lane change/direction determiner 150 may be configured to determine whether the vehicle may arrive at the local goal point when the vehicle is continuously driven in substantially straight (e.g., without turns) in a left road or a right road of the current road of the vehicle to determine whether the lane is changed in which direction of the right direction and the left direction. For example, as in the example of FIG. 3, for the self vehicle 500 to arrive at the local goal point, that is, the segment 26 or 27 from the road on which the self vehicle 500 is currently positioned, the lane change/direction determiner 150 may be configured to determine the lane change in the right direction.

In particular, in response to determining that the lane changes of the number of p (natural number) times (e.g., two or more times) in the left road or the right road of the current road of the vehicle are required, the lane change/direction determiner 150 may also be configured to determine that the lane changes of the number of p times in the corresponding direction once sequentially by the following method are required.

Furthermore, the lane change timing determiner 160 may be configured to determine a lane change timing by synthetically reflecting information regarding a plurality of parameters such as a speed limit of a vehicle for each of the segments, a maximum curvature for each of the segments determined based on a road shape, the number of lanes for each of the segments, the number of times (p times) of lane changes in the corresponding direction, actual driving speed of the vehicle based on a current traffic situation (e.g., average speed during a time between a current and a predetermined prior time, etc.), a time $t_1$ necessary to change the lane for each of the actual driving speeds of the vehicle, and the like, in the path plan as described above (S150).

For example, the lane change timing determiner 160 may be configured to determine a lane change completion segment (e.g., a segment before the segment having the road characteristics such as the crossroads, the crosswalks, the interchanges, the junctions, the speed bumps, the dead-ends, and the like) that the lane change needs to be completed, among all of the segments for each lane up to a target segment, and when a distance ($K=D_{min\_require}+D_{margin}$) calculated to change the lane as described below is greater than a distance ($D_{event}$) from the current position of the vehicle to an end of the corresponding lane change completion segment, the lane change timing determiner 160 may be configured to determine a segment position(s) before the distance ($K=D_{min\_require}+D_{margin}$) calculated to change the lane from the end of the corresponding lane change completion segment, as a timing position for the lane change.

However, the lane change is impossible or difficult to execute at the timing position for the lane change (e.g., the segment position before the distance for the lane change) as described below, the lane change may be performed at a segment before or after the corresponding segment. For example, the lane change timing determiner 160 may be configured to determine a segment immediately before or after a corresponding position (segment) as the timing position for starting the lane change, (1) when a road curvature is greater than a predetermined threshold value, (2) when the number of lanes is one, (3) for the crossroad, (4) in the case of a traffic jam state due to an excessive volume of traffic within the corresponding segment, and the like.

The lane change timing determiner 160 may be configured to calculate a minimum distance ($D_{min\_require}=D_{lc}+D_{dec}$) necessary for the lane change as expressed in Equation 3 by calculating a distance ($D_{lc}$) in which the vehicle is moved during a process of performing the lane change, according to Equation 1 below and calculating a deceleration distance ($D_{dec}$) of cases (e.g., a left turn, a right tutu, a stop, a passage of the speed bump, etc.) in which deceleration of the vehicle is required before the local goal point, according to Equation 2 below, and may be configured to calculate a distance (K=$D_{min\_require}$+$D_{margin}$) for the lane change to be compared with a distance ($D_{event}$) up to the end of the lane change completion segment by summing the minimum distance ($D_{min\_require}$) and a preset distance ($D_{margin}$) for stability of the lane change.

$$D_{lc} = v * (t_1 * p + t_2 * (p-1)) \qquad \text{Equation 1}$$

$$D_{dec} = \sqrt{\frac{v_{last}^2 - v_{current}^2}{2a}} \qquad \text{Equation 2}$$

$$D_{min\_require} = D_{lc} + D_{dec} \qquad \text{Equation 3}$$

Where v denotes speed of the vehicle without deceleration, $t_1$ denotes a time necessary for the lane change, $t_2$ denotes a preset time for stability between the lane change and a next lane change in the case in which the number of execution times (p) of lane change is two or more, $v_{current}$ denotes current speed at the time of starting deceleration, $v_{last}$ denotes final speed at the time of deceleration, and a denotes deceleration.

As the lane change timing determiner 160 determines the timing position (segment) for starting the lane change, the lane changer 170 may be configured to generate a control signal to trigger the change the lane in the corresponding direction from the corresponding position (segment) by sensing forward and backward vehicles of a current lane and a lane to be changed (e.g., surrounding vehicles) using a radar, an infrared sensor, or the like, and a vehicle control system such as an electronic control unit (ECU) of the vehicle may be configured to perform the lane change based on the corresponding control signal.

Figure 4:
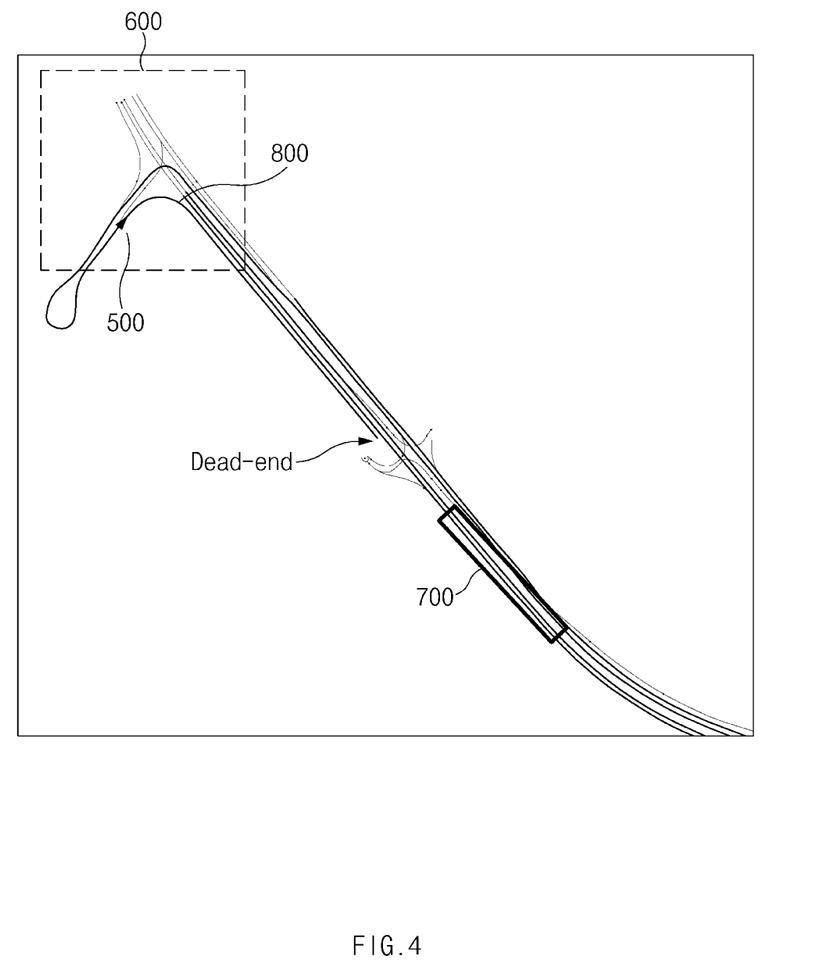
FIG. 4 illustrates an example of a detailed map illustrating a lane changing method performed between the current position of the vehicle and a forward local goal point, according to a control of the autonomous driving control apparatus according to the exemplary embodiment of the present disclosure.

FIG. 4 illustrates an example of a detailed map illustrating a lane changing method performed between the current position of the vehicle and a forward local goal point, according to a control of the autonomous driving control apparatus 100 according to the exemplary embodiment of the present disclosure.

In particular, FIG. 4 illustrates a case in which the self vehicle 500 having the autonomous driving control apparatus 100 is driven on a segment immediately before entering a crossroad 600. When the autonomous driving control apparatus 100 sets two segments 700 as the forward local goal points as illustrated in FIG. 4 and the self-vehicle 500 is driven while maintaining a current driving lane, the self-vehicle 500 may not arrive at the local goal point 700 due to the dead-end segment. Therefore, the autonomous driving control apparatus 100 may be configured to perform a control to execute a left lane change. As described above, the autonomous driving control apparatus 100 may be configured to determine a segment 800 of the timing position for starting the lane change, and since the calculated corresponding segment 800 may be a segment having one lane, the autonomous driving control apparatus 100 may be configured to perform the lane change on a segment having a plurality of lanes such as a segment immediately after the segment 800.

Figure 5:
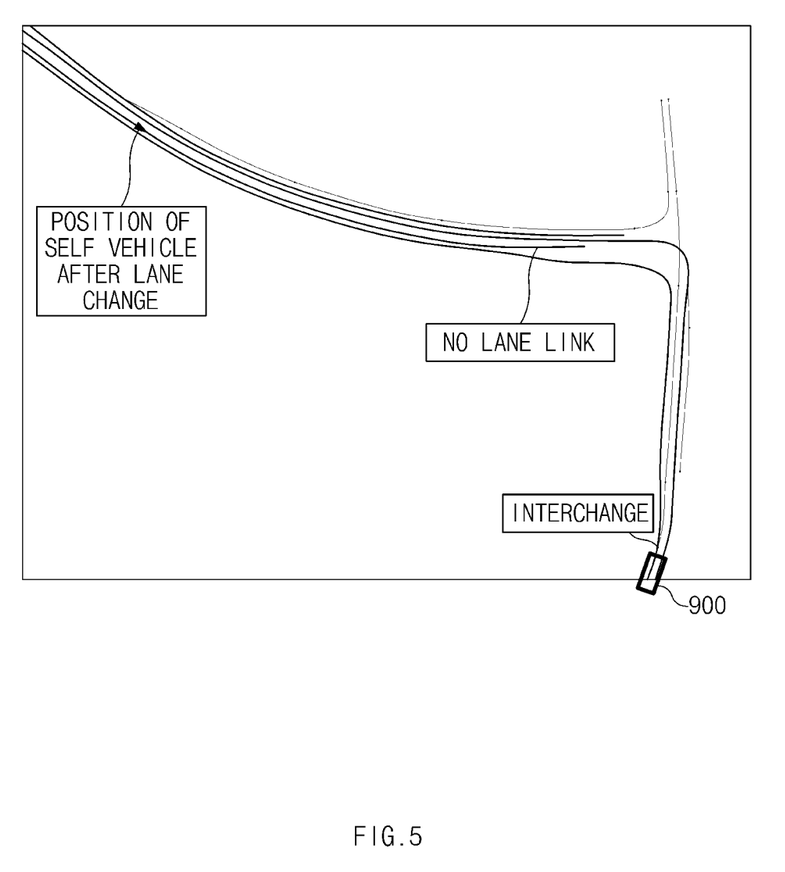
FIG. 5 illustrates an example of a detailed map illustrating a lane changing method performed between a position of the vehicle of which a lane is changed and a new forward local goal point, according to a control of the autonomous driving control apparatus according to the exemplary embodiment of the present disclosure.

FIG. 5 illustrates an example of a detailed map illustrating a lane changing method performed between a position of the vehicle of which a lane is changed and a forward new local goal point, according to a control of the autonomous driving control apparatus 100 according to the exemplary embodiment of the present disclosure.

As illustrated in FIG. 5, after the self vehicle 500 having the autonomous driving control apparatus 100 performs the left lane change as illustrated in FIG. 4, the autonomous driving control apparatus 100 may again be configured to detect a new local goal point on the path plan. Since the self-vehicle 500 arrives at the crossroad while continuously driving after performing the lane change in a left lane direction, but does not arrive at a local goal point 900 while being driven substantially straight (e.g., without turns), the autonomous driving control apparatus 100 may be configured to determine a lane change necessity, as described above. Since a right turn is required at the crossroad from the current position of the self-vehicle 500 to reach the local goal point 900, the autonomous driving control apparatus 100 may be configured to determine and execute a right lane change. Additionally, since the interchange is present after turning to the right at the crossroad and the corresponding lane disappears after the interchange, the autonomous driving control apparatus 100 may be configured to determine and execute a left lane change necessity.

Figure 6:
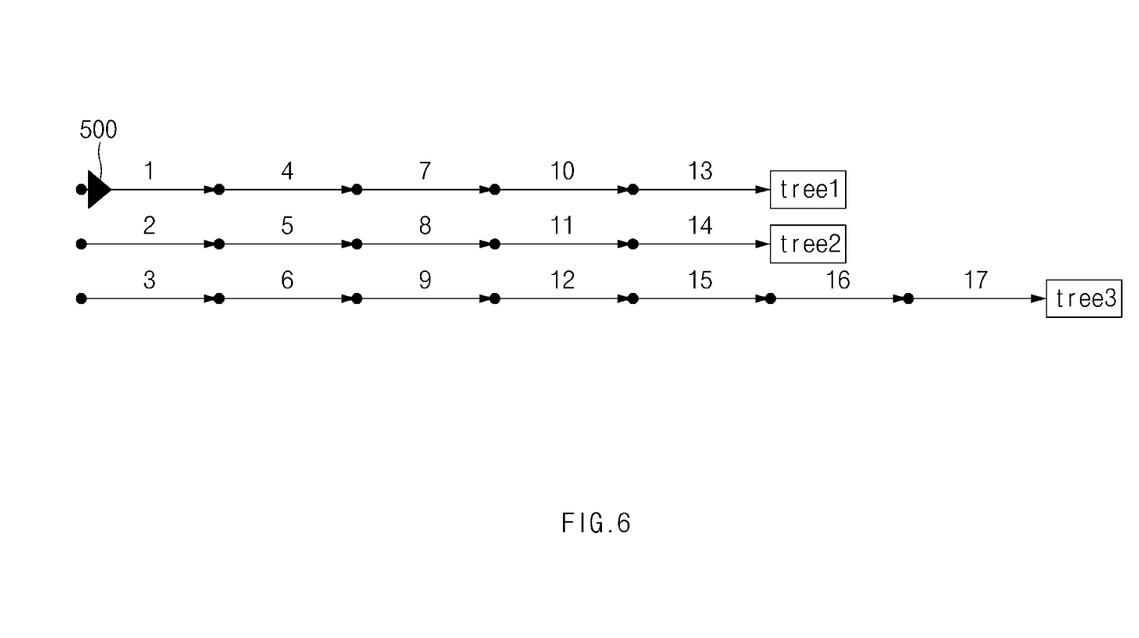
FIG. 6 is an illustrative diagram illustrating a lane changing method in a link relationship of segments having a form of three trees between a current position of a vehicle on a path plan and a local goal point, according to an exemplary embodiment of the present disclosure.

FIG. 6 is an illustrative diagram illustrating a lane changing method in a link relationship of segments having a form of three trees between a current position (segment 1) of a vehicle on a path plan and a local goal point (segment 17), according to an exemplary embodiment of the present disclosure.

In particular, it may be assumed that a length of each segment is about 100 meters, and a speed limit and a driving speed of the self vehicle 500 on a current traffic flow is about 80 kph (kilometers per hour). In addition, in the link relationship of the segments as illustrated in FIG. 6, the autonomous driving control apparatus 100 mounted within the self-vehicle 500 may be configured to set a segment 17 as the local goal point at the current position (segment 1) of the vehicle. For the self vehicle 500 to arrive at the segment 17 from the current position (segment 1) of the vehicle, the self-vehicle 500 may be configured to execute two lane changes in the right direction, and the two lane changes may be completed up to a segment 12 before segments 13 and 14 (or segment 15) corresponding to the road characteristics such as the dead-end, and the like. In other words, it may be assumed that the distance ($D_{event}$) from the current position of the vehicle to an end of the corresponding lane change completion segment (segment 11) (or segment 10/12) is about 400 meters (($D_{event}$)=400 meters), the driving speed of the self-vehicle 500 is about 80 kph, the number of times (p times) of lane changes is two, the time $t_1$ necessary for the lane change for each of the actual driving speeds of the vehicle is about 5 seconds at about 80 kph, the preset time $t_2$ for stability between the lane change and the next lane change is about 5 seconds.

Therefore, according to Equations 1 to 3, the distance ($D_{lc}$) in which the vehicle is moved during a process of performing the lane change may be about 333 meters (($D_{lc}$)=2 times*5 sec/times*80 KPH+1 times*5 sec/times*80 KPH=333 meters). In addition, when the cases (e.g., a left turn, a right turn, a stop, a passage of the speed bump, etc.) in which deceleration of the vehicle is required does not occur, deceleration may be unnecessary. Therefore, if it may be assumed that the deceleration distance ($D_{dec}$) is about zero and the preset distance ($D_{margin}$) for stability of the lane change is about 100 meters, the distance (K=$D_{min\_require}$+$D_{margin}$) for the lane change is about 433 meters ((K=$D_{min\_require}$±$D_{margin}$)=$D_{lc}$+$D_{dec}$+$D_{margin}$=333+0+100=433 meters), which is greater than $D_{event}$.

Therefore, the autonomous driving control vehicle 100 may be configured to determine a segment before the segments 13 and 14 (or segment 15) corresponding to the road characteristics such as the dead-end, and the like, that is, a segment position before the distance (K=$D_{min\_require}$+$D_{margin}$)=433 meters) calculated to perform the lane change from an end of the lane change completion segment (segment 10/11/12), as the timing position for starting the lane change, and in the example of FIG. 6, since the self-vehicle 500 is on a point before 433 meters from the road characteristic, the autonomous driving control apparatus 100 may be configured to start the lane change at a current segment.

Figure 7:
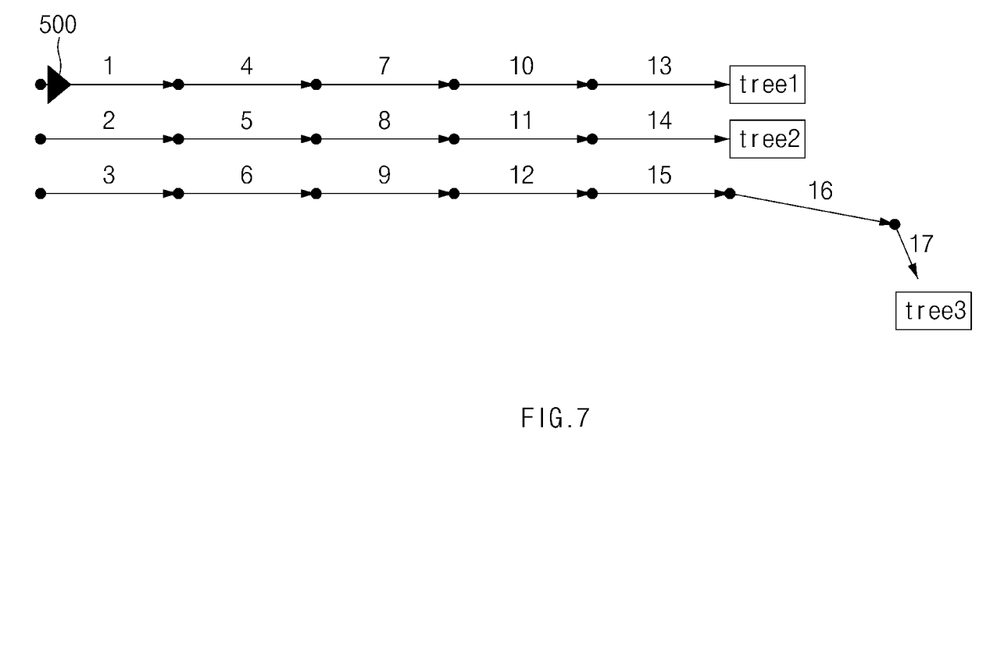
FIG. 7 is another illustrative diagram illustrating a lane changing method in a link relationship of segments having a form of three trees between a current position of a vehicle on a path plan and a local goal point, according to an exemplary embodiment of the present disclosure.

FIG. 7 is another illustrative diagram illustrating a lane changing method in a link relationship of segments having a form of three trees between a current position (segment 1) of a vehicle on a path plan and a local goal point (segment 17), according to an exemplary embodiment of the present disclosure.

Particularly, when it may be assumed that a length of each of all of the segments is about 100 meters, and a speed limit and a driving speed of the self vehicle 500 on a current traffic flow is about 80 kph (kilometers per hour), a segment 16 corresponds to a zone in which the self vehicle 500 turns to the right at the crossroad, and it may be assumed that suitable speed of the vehicle in this zone is about 20 kph. In addition, in the link relationship of the segments as illustrated in FIG. 7, the autonomous driving control apparatus 100 mounted within the self-vehicle 500 may be configured to set the segment 17 as the local goal point at the current position (segment 1) of the vehicle. For the self vehicle 500 to arrive at the segment 17 from the current position (segment 1) of the vehicle, the self-vehicle 500 may be configured to execute two lane changes in the right direction, and the two lane changes may be completed up to a segment 12 before a segment 15 (or segments 13 and 14).

In other words, it may be assumed that the distance ($D_{event}$) from the current position of the vehicle to an end of the corresponding lane change completion segment (segment 11) (or segment 10/12) is about 400 meters (($D_{event}$)=400 meter), the current driving speed of the self-vehicle 500 is about 80 kph, the number of times (p times) of lane changes is two, the time $t_1$ necessary for the lane change for each of actual driving speeds of the vehicle is about 5 seconds at about 80 kph, the preset time $t_2$ for stability between the lane change and the next lane change is about 5 seconds.

Therefore, according to Equations 1 to 3, the distance ($D_{lc}$) in which the vehicle is moved during a process of performing the lane change may be about 333 meters (($D_{lc}$)=2 times*5 sec/times*80 KPH+1 times*5 sec/times*80KPH=333 meters). In addition, when the cases (e.g., a left turn, a right turn, a stop, a passage of the speed bump, etc.) in which deceleration of the vehicle is required occurs and it may be assumed that deceleration (a) is −0.2 m/sec² (a=−0.2 m/sec²), since $v_{current}$=80 KPH and $v_{last}$=20 KPH, the deceleration distance ($D_{dec}$) is 35 (see Equation 2).

In addition, when it is assumed that the preset distance ($D_{margin}$) for stability of the lane change is about 100 meters, the distance (K=$D_{min\_require}$+$D_{margin}$) for the lane change may be about 468 meters ((K=$D_{min\_require}$+$D_{margin}$)=$D_{lc}$+$D_{dec}$+$D_{margin}$=333+35+100=468 meters), which is greater than $D_{event}$. Therefore, the autonomous driving control vehicle 100 may be configured to determine a segment before the segments 13 and 14 (or segment 15) corresponding to the road characteristics such as the dead-end, and the like, that is, a segment position before the distance (K=$D_{min\_require}$+$D_{margin}$)=468 meters) calculated to perform the lane change from an end of the lane change completion segment (segment 10/11/12), as the timing position for starting the lane change, and in the example of FIG. 7, since the self vehicle 500 is on a point before 468 meters from the event, the autonomous driving control apparatus 100 may be configured to start the lane change at a current segment.

Figure 8:
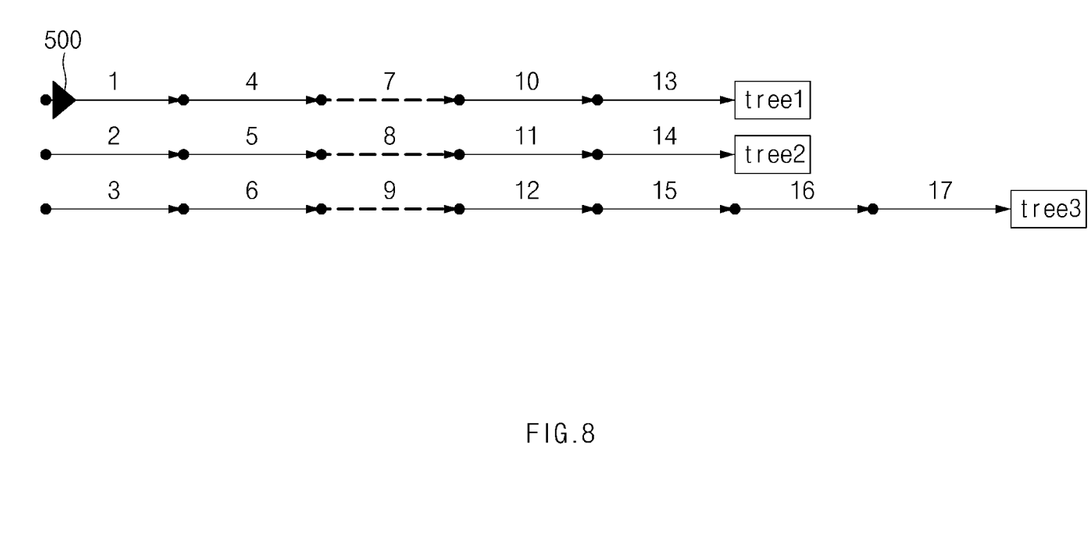
FIG. 8 is still another illustrative diagram illustrating a lane changing method in the case in which crossroads 7, 8, and 9 are present between a current position of a vehicle on a path plan and a local goal point, according to an exemplary embodiment of the present disclosure.

FIG. 8 is still another illustrative diagram illustrating a lane changing method in the case in which crossroads 7, 8, and 9 are present between a current position (segment 1) of a vehicle on a path plan and a local goal point (segment 17), according to an exemplary embodiment of the present disclosure.

In particular, it may be assumed that a length of each of all of the segments is about 200 meters, and a speed limit and a driving speed of the self vehicle 500 on a current traffic flow is about 80 kph (kilometers per hour). In addition, in the link relationship of the segments as illustrated in FIG. 8, the autonomous driving control apparatus 100 mounted within the self-vehicle 500 may be configured to set the segment 17 as the local goal point at the current position (segment 1) of the vehicle. It may be assumed that the segments 7, 8, and 9 are the crossroads. For the self vehicle 500 to arrive at the segment 17 from the current position (segment 1) of the vehicle, the self-vehicle 500 may be configured to execute two lane changes in the right direction, and the two lane changes may be completed up to a segment 12 before segments 13 and 14 (or segment 15) corresponding to the road characteristics such as the dead-end, and the like.

In other words, it may be assumed that the distance ($D_{event}$) from the current position of the vehicle to an end of the corresponding lane change completion segment (segment 11) (or segment 10/12) is about 800 meters (($D_{event}$)=800 meter), the driving speed of the self-vehicle 500 is about 80 kph, the number of times (p times) of lane changes is two, the time $t_1$ necessary for the lane change for each of the actual driving speeds of the vehicle is about 5 seconds at about 80 kph, the preset time $t_2$ for stability between the lane change and the next lane change is about 5 seconds.

Therefore, according to Equations 1 to 3, the distance ($D_{lc}$) in which the vehicle is moved during a process of performing the lane change may be about 333 meters (($D_{lc}$)=2 times*5 sec/times*80 KPH+1 times*5 sec/times*80 KPH=333 meters). In addition, when the cases (e.g., a left turn, a right turn, a stop, a passage of the speed bump, etc.) in which deceleration of the vehicle is required does not occur, deceleration may be unnecessary. Therefore, when it is assumed that the deceleration distance ($D_{dec}$) is about zero and the preset distance ($D_{margin}$) for stability of the lane change is about 100 meters, the distance (K=$D_{min}$+$D_{margin}$) for the lane change may be 433 meters ((K=$D_{min\_require}$+$D_{margin}$)=$D_{lc}$+$D_{dec}$+$D_{margin}$=333+0+100=433meters), which is less than $D_{event}$.

Accordingly, the autonomous driving control vehicle 100 may be configured to determine a segment before the segments 13 and 14 (or segment 15) corresponding to the road characteristics such as the dead-end, and the like, that is, a segment position before the distance (K=$D_{min}$+$D_{margin}$)=433 meters) calculated to perform the lane change from an end of the lane change completion segment (segment 10/11/12), as the timing position for starting the lane change. In the example of FIG. 8, the autonomous driving control apparatus 100 may be configured to start the lane change after a zone of a segment 4 in which the self vehicle 500 is on a point before 433 meters from the event. However, since a lane marking is not present within the crossroad, the lane change may not be performed, and since the segments 7, 8, and 9 are within the crossroad, the lane change may be performed at a segment 10 immediately after the segments 7, 8, and 9 (or a segment 4 immediately before the segments 7, 8, and 9).

As described above, according to the exemplary embodiments of the present disclosure, the autonomous driving control apparatus 100 may be configured automatically determine whether the lane change is required and effectively determine the timing of the lane change when the lane change is required, based on the shapes of the forward roads, the link relationship between the roads, the speed limit, the number of lane, the road characteristics (e.g., the crossroads, the crosswalks, the interchanges, the junctions, the speed bumps, the dead-ends, etc.), and the like, recognized from the detailed map while assisting the autonomous driving of the vehicle, thereby making it possible to support the driver to more conveniently, stably, and efficiently arrive at the destination by the aid of the autonomous driving.

Hereinabove, although the present disclosure is described by specific matters such as concrete components, and the like, exemplary embodiments, and drawings, they are provided merely for assisting in the entire understanding of the present disclosure. Therefore, the present disclosure is not limited to the exemplary embodiments. Various modifications and changes may be made by those skilled in the art to which the present disclosure pertains from this description. Therefore, the spirit of the present disclosure should not be limited to the above-described exemplary embodiments, and the following claims as well as all technical spirits modified equally or equivalently to the claims should be interpreted to fall within the scopes and spirits of the disclosure.

What is claimed is:

1. An autonomous driving control method of a vehicle, comprising:
    generating, by a controller, a path plan from a current position of the vehicle toward a destination with reference to a map database while driving the vehicle;
    determining, by the controller, a farthest segment among a plurality of segments for each lane of a road from the current position of the vehicle to a predetermined target segment on the path plan as a local goal point;
    determining, by the controller, whether \ a lane change is required to arrive at the local goal point and determining a direction of the lane change when the lane change is required; and
    determining, by the controller, a lane change completion segment among the segments for each lane up to the target segment and determining a segment position before a distance for the lane change from an end of the lane change completion segment as a timing position for the lane change,
    wherein the target segment includes,
        a segment which is spaced apart from the current position of the vehicle in a forward direction by a predetermined distance,
        a farthest segment that corresponds to when a summation of the number of segments forward from the current position of the vehicle becomes a predetermined number, or
        a farthest segment that corresponds to when a summation of the number of events forward from the current position of the vehicle becomes the predetermined number.

2. The autonomous driving control method according to claim 1, wherein the path plan includes information regarding at least one selected from the group consisting of: a shape of a road, a link relationship between the segments linking between road separation nodes, a speed limit of the vehicle, the number of lanes, and road characteristics.

3. The autonomous driving control method according to claim 1, wherein in the determination of the direction of the lane change, the direction of the lane change in a left direction or a right direction is determined based on whether the vehicle arrives at the local goal point by driving straight after performing the lane change in the left or right direction.

4. The autonomous driving control method according to claim 1, wherein in the determination of the segment position as the timing position for the lane change, a segment before segments having an event including a crossroad, a crosswalk, an interchange, a junction, a speed bump, or a dead-end is determined as the lane change completion segment.

5. The autonomous driving control method according to claim 1, wherein when the segment before the distance for the lane change has a road curvature of a predetermined threshold value or greater, the number of lanes is one, for a crossroad, or during a traffic jam state due to an excessive traffic volume within a corresponding segment, a segment immediately before or after the corresponding segment is determined as the timing position for the lane change.

6. The autonomous driving control method according to claim 1, wherein in the determination of the segment position as the timing position for the lane change, when the distance for the lane change is greater than a distance from the current position of the vehicle to the end of the lane change completion segment, a segment position before the distance for the lane change is determined as the timing position for the lane change.

7. The autonomous driving control method according to claim 1, wherein in the determination of the segment position as the timing position for the lane change, a minimum distance necessary for the lane change is calculated by calculating a distance in which the vehicle is moved during a process of performing the lane change and a deceleration distance, and a preset distance is reflected for stability of the lane change, to calculate the distance for the lane change.

8. The autonomous driving control method according to claim 7, wherein in the determination of the segment position as the timing position for the lane change, the following Equation is calculated, $$D_{lc} = v * (t_1 * p + t_2 * (p-1))$$

wherein $D_{lc}$, is a distance in which the vehicle is moved during a process of performing a lane change, v is a speed of the vehicle, $t_1$ is a time necessary for the lane change, and $t_2$ is a preset time for stability between the lane change and a next lane change when the number of execution times (p) of the lane change is two or more.

9. An autonomous driving control apparatus of a vehicle, the autonomous driving control apparatus comprising:
    a path generator configured to generate a path plan from a current position of the vehicle to a destination with reference to a map database while driving the vehicle;
    a segment/local goal point determiner configured to determine a farthest segment among a plurality of segments for each lane of a road from the current position of the vehicle to a predetermined target segment on the path plan as a local goal point;
    a lane change/direction determiner to determine whether a lane change is required to arrive at the local goal point and determine a direction of the lane change when the lane change is required; and a lane change timing determiner configured to determine a lane change completion segment among the segments for each lane up to the target segment and determine a segment position before a distance for the lane change from an end of the lane change completion segment as a timing position for the lane change, wherein the target segment includes,
- a segment which is spaced apart from the current position of the vehicle in a forward direction by a predetermined distance,
- a farthest segment that corresponds to when a summation of the number of segments forward from the current position of the vehicle becomes a predetermined number, or
- a farthest segment that corresponds to when a summation of the number of events forward from the current position of the vehicle becomes the predetermined number.

10. The autonomous driving control apparatus according to claim 9, wherein the path plan includes information regarding at least one selected from the group consisting of: a shape of a road, a link relationship between the segments linking between road separation nodes, a speed limit of the vehicle, the number of lanes, and road characteristics.

11. The autonomous driving control apparatus according to claim 9, wherein the lane change/direction determiner is configured to determine a direction of the lane change in a left direction or a right direction based on whether the vehicle arrives at the local goal point by driving straight after performing the lane change in the left or right direction.

12. The autonomous driving control apparatus according to claim 9, wherein the lane change timing determiner is configured to determine a segment before segments having a road characteristic including a crossroad, a crosswalk, an interchange, a junction, a speed bump, or a dead-end, as the lane change completion segment.

13. The autonomous driving control apparatus according to claim 9, wherein when the segment before the distance for the lane change has a road curvature of a predetermined threshold value or greater, the number of lanes is one, for a crossroad, or during a traffic jam state due to an excessive traffic volume within a corresponding segment, the lane change timing determiner is configured to determine a segment immediately before or after the corresponding segment as the timing position for the lane change.

14. The autonomous driving control apparatus according to claim 9, wherein when the distance for the lane change is greater than a distance from the current position of the vehicle to the end of the lane change completion segment, the lane change timing determiner is configured to determine a segment position before the distance for the lane change, as the timing position for the lane change.

15. The autonomous driving control apparatus according to claim 9, wherein the lane change timing determiner is configured to calculate the distance for the lane change by calculating a distance in which the vehicle is moved during a process of performing the lane change and a deceleration distance to calculate a minimum distance necessary for the lane change, and reflecting a preset distance for stability of the lane change.

16. The autonomous driving control apparatus according to claim 15, wherein the lane change timing determiner is configured to calculate the distance in which the vehicle is moved during a process of performing the lane change using the following Equation, $$D_{lc} = v*(t_1*p + t_2*(p-1))$$

wherein v is a speed of the vehicle, $t_1$ is a time necessary for the lane change, and $t_2$ is a preset time for stability between the lane change and a next lane change when the number of execution times (p) of the lane change is two or more.

* * * * *